INVENTOR.
Henry Clay Marks

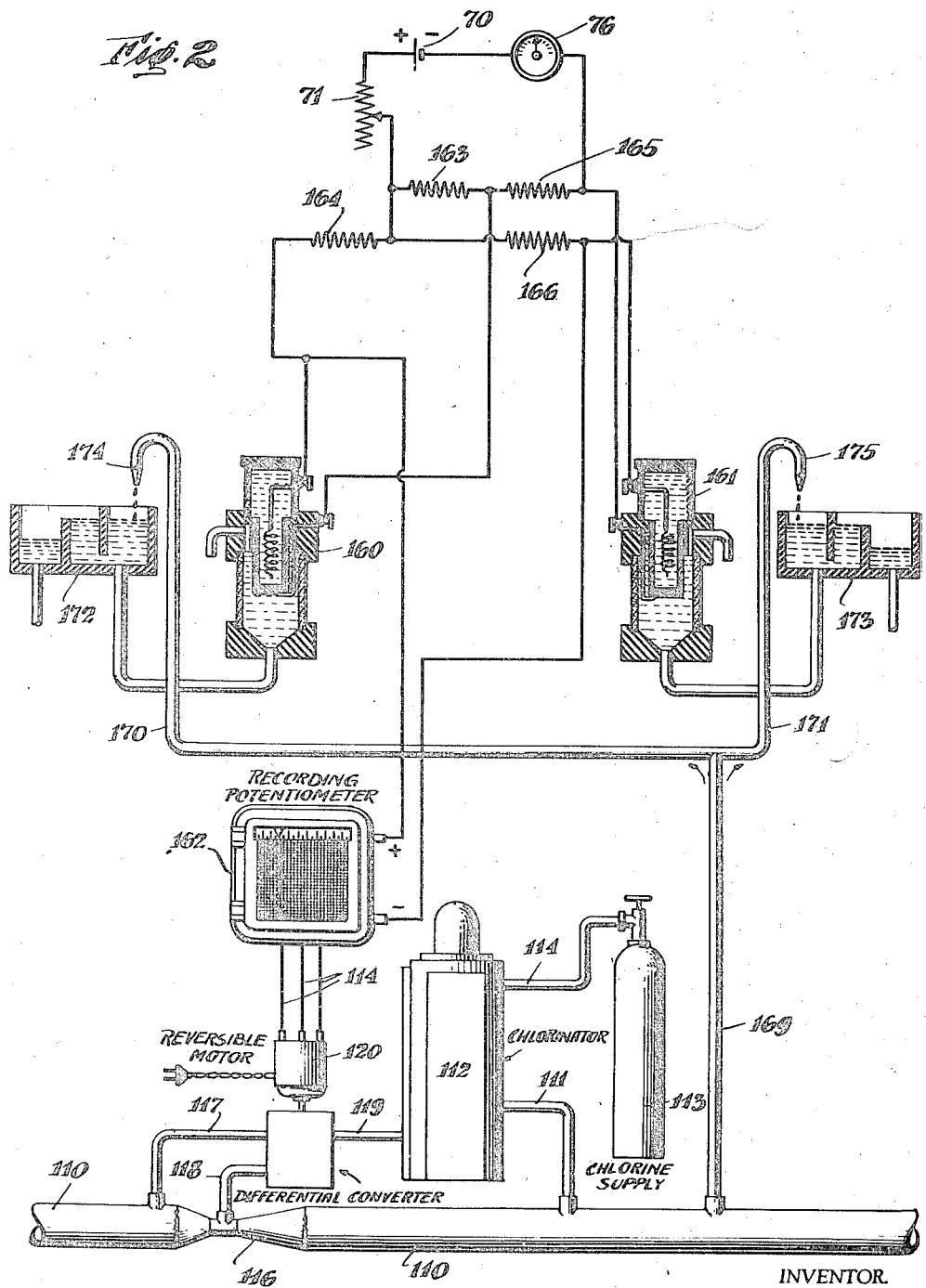

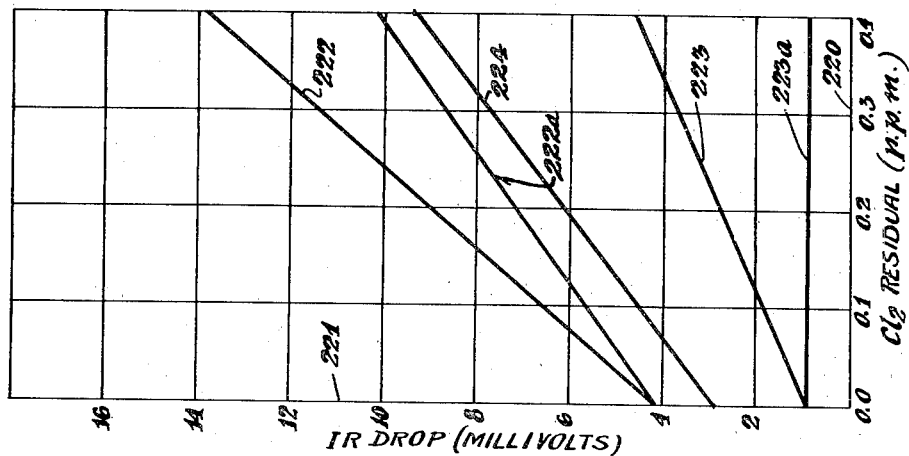
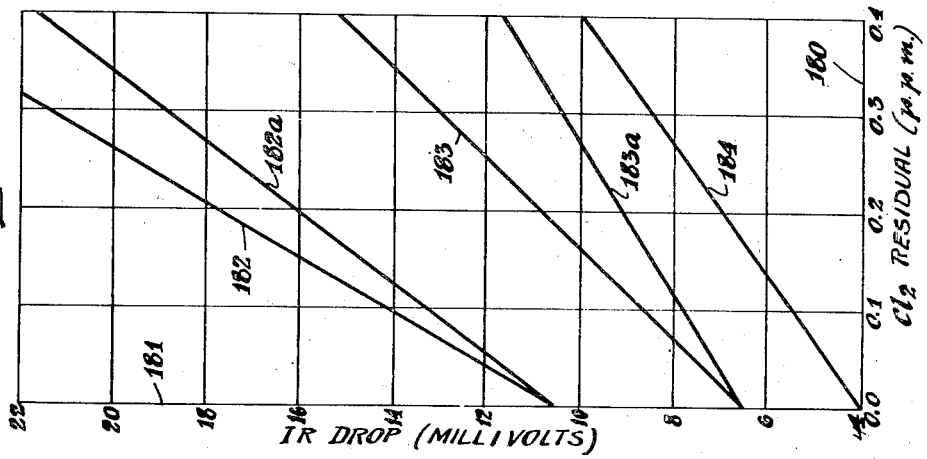

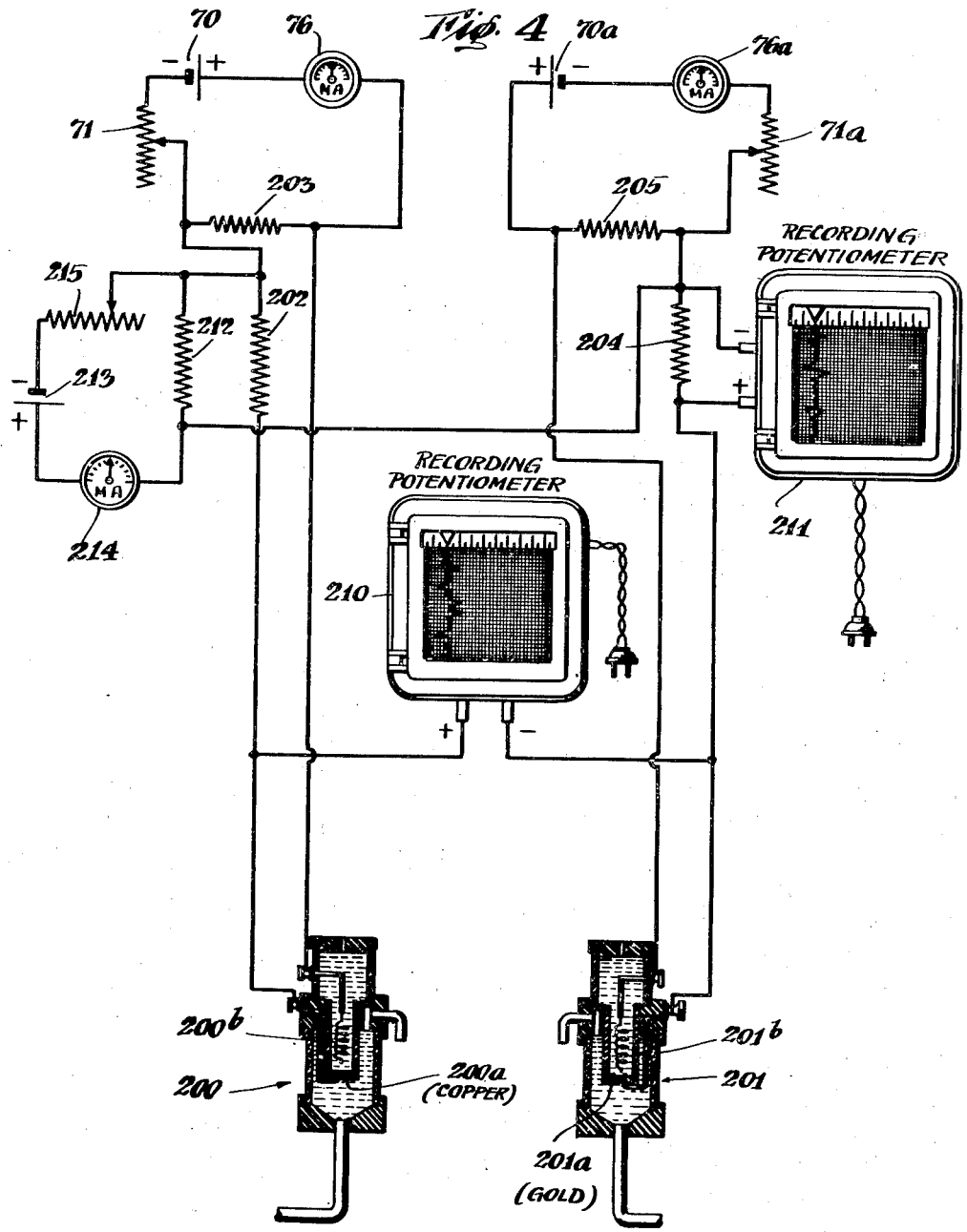

Patented Jan. 14, 1947

2,414,411

UNITED STATES PATENT OFFICE 2,414,411

DETECTION OF OXIDIZING OR REDUCING SUBSTANCES BY ELECTRODE DEPOLARIZATION

Henry Clay Marks, Bloomfield, N. J., assignor to Wallace & Tiernan Products, Inc., Belleville, N. J., a corporation of New Jersey Application September 25, 1941, Serial No. 412,316

5 Claims. (Cl. 175—183)

This invention relates to electrical detection of the chemical composition of liquids and more particularly to procedure and apparatus for determining the content of oxidizing or reducing substances in a liquid, by the so-called depolarization method, for example as disclosed and claimed in the application of Charles F. Wallace, Serial No. 290,842, filed August 18, 1939, for Methods and systems of apparatus for detecting and controlling changes in composition of liquids, which has now matured into Patent No. 2,350,378, issued June 6, 1944. In the depolarization method, as employed in the present invention, a polarizing E. M. F. is applied across electrodes of which at least one is exposed to the liquid under test and the current flowing between the electrodes, which varies with changes in the extent of depolarization produced by the liquid under test, is detected as a measure or indication of the chemical composition of the liquid, for instance, to detect the amount of chlorine in water, sewage or other liquid treated therewith, or to detect other substances of oxidizing or reducing character in aqueous liquids.

It will be understood that by polarizing E. M. F. is meant a voltage adapted to produce polarization of an electrode exposed to the liquid, and the detected current is that resulting upon the depolarization produced at such electrode by the oxidizing or reducing material; the polarizing voltage being insufficient to electrolyze the liquid. The reading is thus not a determination of the conductivity (or resistivity) of the liquid, nor is it a simple detection of electrode potential, and generally speaking the procedure is independent of considerable variations in the conductivity of the liquid. In some cases, however, the depolarization current has been found to vary considerably with changes in dissolved materials in the liquid, as well as with other extraneous factors.

Accordingly an important object of the present invention is to provide methods and systems of apparatus of the character described, which afford precise and reproduceable results and which are more accurate, more reliable and less susceptible of impairment (as to readings) by extraneous factors, than systems available prior to my invention. A further object is to provide improved procedure and apparatus whereby readings may be taken of either cathode or anode depolarization, according to the design of the system, without interference from the other type; as for example, where a liquid may contain both oxidizing and reducing agents and it is desired to measure or detect changes of one of them without hindrance from the other type of material, it being understood that oxidizing agents cause cathode depolarization while reducing agents cause anode depolarization.

Further objects of the invention are to provide, in methods and systems of the character described, for a very rapid reponse to changes in composition of the solution under test; to provide arrangements which operate independently of certain variations in cell materials, for instance variations between different methods of making a given electrode metal; to provide apparatus affording an essentially linear relation, over wide ranges, between the detected flow of current and the concentration of the substance, such as chlorine, for which the test is made; and to provide improved and efficient arrangements for eliminating or balancing out particularly disturbing effects found to result from temperature changes or from the presence of particular materials, such as the presence of ammonia in aqueous liquids which have been treated with chlorine. Yet further objects are to provide improved structure and procedure for the control of treating systems in accordance with changes of composition of the liquid undergoing treatment, for instance as of the character hereinabove described.

In its presently preferred embodiments, the invention contemplates the separation of one electrode from the liquid under test, as by exposing to the liquid only that electrode (e. g. anode or cathode) at which the depolarization is to be measured, and electrically connecting the other electrode to the liquid through a "salt bridge," or separate constant electrolyte, preferably of high conductivity, separation of the salt or other electrolyte solution from the liquid under test being effected with a porous diaphragm. The porous diaphragm prevents mutual contamination of the separated liquids while affording the desired electrical contact, as by ionic diffusion. Presently preferred cell and electrode structure to that end is described and claimed in my copending application Serial No. 390,074, now Patent No. 2,382,735, issued August 14, 1945, wherein the porous separating device includes a conducting surface, part or body exposed to the liquid under test and serving as the exposed electrode; and an important feature of procedure and systems of the present invention, embodying such electrode structure, is that the electrical path through the liquid under test between the electrodes, is reduced to a minimum, so as to minimize and indeed practically obviate many otherwise adverse effects which might result from changes in conductivity of the liquid under test, the resistance of a liquid path being proportional to its length.

For example, a particularly effective structure of such device comprises a porous partition, such as porous porcelain, Alundum, porous rubber, tightly packed asbestos fibres, or the like, and has mounted next to the partition a thin, flat sieve of conducting material to provide the electrode that is exposed to the liquid under test. Thus such electrode may consist of a thin sheet of metal perforated with many small holes, or a sheet of wire gauze, or like freely permeable and directly conductive member, held tightly against the porous diaphragm.

By separating one of the electrodes from the liquid under test, detection may be had of one type of depolarization, without adverse effect from such tendency as may be present in variable amounts, to depolarize the other electrode. For exampe, such procedure is of special importance in controlling the dechlorination of liquids with substances of the nature of sulphur dioxide. Chlorine, an oxidizing agent, will cause cathode depolarization while sulphur dioxide, a reducing agent, will cause anode depolarization, and if both anode and cathode are exposed to the liquid, both effects will produce the same apparent change in a cell reading, that is, an increase in the current flowing. As a result, ambiguities are entertained in attempting to control dechlorination with a depolarization cell having both electrodes exposed; but with my present invention, particularly embodying the preferred arrangements of electrode structure and operation, only one type of depolarization may occur and at the same time changes in conductivity or resistivity have a relatively minimum effect on the readings. Consequently, for instance, if the cathode alone is exposed, the current is increased only by the presence of chlorine and it is therefore possible to control the dosage of sulphur dioxide so as to lower the chlorine residual from any given concentration down to a small predetermined value.

Another advantage of systems wherein only a single electrode is exposed to the solution under test is that the reading of the cell is relatively independent of the history of both electrodes, i. e., is unaffected by methods of fabrication, heat treatment, working or like manufacturing operations performed on the metal of the electrodes; whereas it has been found that in some cases, with other types of apparatus, the history of the electrodes appears to have considerable effect on the operation of the system.

Further features of the invention, more specifically described hereinbelow and preferably including electrode and cell structures of the sort described, include balancing or comparative arrangements of a plurality of cells, for further reduction of deleterious effects, and for increasing the accuracy and sensitivity of response to changes in the concentration of a given predetermined substance in the liquid.

Although the procedure and apparatus may be applied to the detection of a large variety of substances, such as oxidizing agents (for example dissolved oxygen concentration in water) where the cathode is exopsed, or reducing substances (such as sulphur dioxide in an aqueous liquid) where the anode is exposed, a particularly important aspect of the invention is in the detection of residual or available chlorine, i. e., the chlorine content of water, sewage or other liquid which has been treated with chlorine for purification or like purposes. The invention may be further and more completely explained by reference to certain specific embodiments thereof, set forth by way of example and illustrated in the accompanying drawings, and likewise by way of example and in view of the present importance of such operations, the invention will be described primarily ni connection with the indication, recording or control of the chlorine content of water (or other aqueous liquid) which has been treated therewith.

Referring to the drawings:

Fig. 2 is a form of system embodying a pair of cells for comparison thereof;

Fig. 3 is a graph showing various response curves obtainable with apparatus of the sort shown in Fig. 2;

Fig. 4 is another modification, shown diagrammatically and including a pair of cells arranged for comparison; and Fig. 5 is a graph showing response curves obtainable with a system of the sort shown in Fig. 4.

Figure 1:
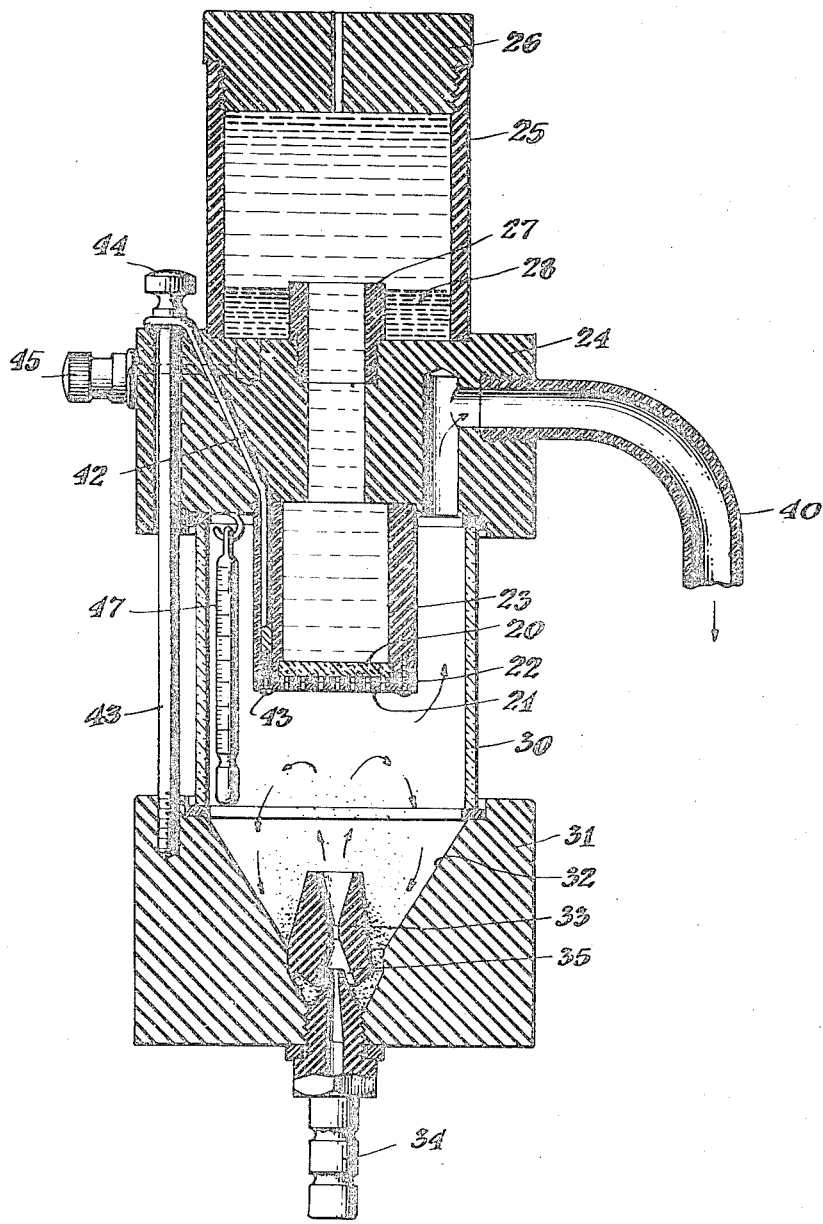
Fig. 1 is a vertical section of one presently preferred form of cell for embodiment in the invention.

Although other cells and electrode structures may be used, Fig. 1 illustrates certain general and specific aspects of construction that are presently preferred for embodiment in the systems of the invention. Apparatus of the type shown in Fig. 1 and various modifications thereof, similarly suitable for inclusion in the present invention, are disclosed and claimed in my aforesaid Patent No. 2,382,735 and apparatus of such character is likewise disclosed in my co-pending application Serial No. 372,208, now Patent No. 2,382,734, issued August 14, 1945, for Electrical determination or control of oxidizing or reducing substances in liquids, wherein certain procedure is described which embodies some aspects of the invention herein claimed, to which patents reference may be conveniently had for a more complete description of the cell structure.

In general the device comprises a porous diaphragm 20 consisting of a porous porcelain disk and having adjacent to one face thereof (here, the under face) a thin, sieve-like or foraminous metal disk or plate 21, which serves as an electrode to be exposed to the liquid under test. Preferably in many cases, a thin layer of insulating material 22, perforated congruently with the disk 21, is disposed intermediate the disk and porous member 20. The disk 21, insulating layer and porous member 20 are clamped together against and across the lower end of a tube 23, which communicates through a head 24 with an upper chamber 25 having a suitably ventilated closure 26. The communication of the tube 23 into the chamber 25 is preferably through an upstanding collar 27, providing an annular recess around the collar which may be filled, for example, with mercury 28 to provide the other electrode of the cell.

It may be explained that the insulating layer 22 is preferably impervious to liquid and may comprise a coating of insulating lacquer or cement on the upper surface of the electrode disk 21, or may be a separate sheet of mica, Celluloid or other insulating plastic or like material. In some cases where the electrode 21 is a metal, such as gold or platinum, which is not corroded or acted upon by the electrolyte above the porous disk 20, the insulating film 22 may be omitted, as apparently the polarization of the upper surface of such an electrode prevents short circuit with the electrolyte diffusing through from the other side of the porous member 20; similar prevention of short circuit occurring in cases where the porous separator and exposed electrode are unified, as in a single porous conducting element, e. g. a porous graphite (carbon) disk, or one made of compressed and sintered metal powder (e. g. gold) or a porous porcelain disk impregnated with gold or platinum. It will be noted that in such unified devices the exposed electrode surface is permeable only by diffusion as of ionic character (like the diaphragm 20), whereas the separate perforated disk 21 is freely permeable, by actual liquid flow.

The chamber 25, tube 23 and communicating passage are filled with a suitable electrolyte, preferably of high conductivity, such as a twice normal solution of potassium chloride, or other chloride, or salt or acid (such as hydrochloric acid) solution. Where the porous diaphragm and the exposed electrode are unified in a single porous conducting member, the use of an acid (for instance, normal hydrochloric acid) for the medium of constant composition extending to the other electrode has been found of special advantage, as more fully stated in my said Patent No. 2,382,735, in keeping the exposed electrode clean and apparently (in chlorine detection) in converting chloramines to hypochlorous acid adjacent to the exposed electrode.

Referring further to Fig. 1, the cell chamber proper, surrounding the electrode 21, comprises a cylindrical and conveniently transparent wall 30 and a base or lower end portion 31. The base 31 conveniently has an internal, generally conical recess 32 which is fitted with a nozzle or Venturi device 33 having an appropriate nipple or pipe-connecting member 34. The Venturi device 33 is conveniently made in two parts as shown, separated by a space 35, and an abrasive powder, conveniently non-conducting and of higher specific gravity than the liquid to be tested, is disposed in the lower part of the recess 32 and about the Venturi device. It will be seen that as liquid enters the cell continuously through the member 34, and is projected against the lower surface of the electrode 21 by the Venturi device, abrasive material is entrained in the stream of liquid and thrown against the electrode surface. This provides an effective cleaning action and avoids any deleterious effects which might otherwise occur in the cell, not only from foreign matter already present in the liquid, but also from the formation of films such as may be produced by slime-producing organisms in the liquid. The liquid passes away from the cell through an outlet 40, the abrasive material returning to the conical recess 32 for recirculation as further liquid is projected against the electrode.

Connection to the electrode 21 may be made by a suitable conductor 42, into which is threaded one of the mounting screws 43 of the electrode, and which extends through the tube 23 and the head 24 to an appropriate terminal 44. A further terminal 45 may likewise be connected to the annular mercury pool 28, to provide the other terminal of the cell.

For manual temperature compensation, as hereinabove explained, the cell may include a thermometer 47, reading the temperature of the liquid as it passes the electrode. Preferably all parts of the cell exposed to corrosive liquids should be made of inert materials; for example where a salt solution such as potassium chloride is used as the electrolyte of the salt bridge embodied in the tube 23 and the chamber 25, and where the liquid traversing the cell is being tested for chlorine concentration, the wall 30 may be made of glass, and the other exposed cell parts made of hard rubber, Bakelite or like non-corrosive material.

Certain features of the cell, including the arrangement for jetting abrasive material against the electrode, and depolarization systems embodying such means, are disclosed and claimed in the co-pending application of Charles F. Wallace, Serial No. 290,841, filed August 18, 1939, for Electrodes and cells, etc., and in the aforesaid Wallace application, Serial No. 290,842, now Patent No. 2,350,378, granted June 6, 1944; to which reference may be had for more detailed description of various features herein illustrated or mentioned.

The system comprises means for applying a polarizing voltage across the electrodes 21 and 28 of the cell, together with means converting the depolarization current through the cell into a suitable potential drop, and means for detecting the resulting potential drop, or its changes due to chages in the composition of the liquid traversing the cell. It may here be noted that the electrode 21 is exposed to the liquid under test, and where chlorine is to be detected, is made the cathode. The other electrode 28 is in such case the anode and is separated from the liquid under test, although electrically connected thereto through the salt solution and the porous diaphragm, which prevents any substantial mixing of the salt solution with the liquid under test. Generally speaking the electrodes may be constructed of any metal which does not displace hydrogen from water, for example, platinum, gold, copper, mercury or the like.

A constant or a substantially constant voltage is applied across the electrodes and, as explained, the current flowing through the cell is taken as a measure of the concentration of oxidizing or reducing agents; it being understood that if a reducing agent (such as sulphur dioxide) is measured, the exposed electrode is made the anode. The polarizing voltage is, as will be understood, very small, indeed less than 1.5 volts and generally ranges from 0.1 to 1.0 volts, depending chiefly on the material of which the anode is constructed (no matter which type of depolarization is being measured, i. e., no matter which electrode is exposed). In general, the more noble the anode metal, the higher the voltage that must be applied. For example, if the anode is gold, approximately 1 volt should be impressed on the cell for satisfactory operation, whereas with metals such as mercury or silver (as shown) for the anode, voltages of the order of 0.1 volt are satisfactory.

Referring to Fig. 2, the liquid to be tested or controlled may, for instance, consist of water flowing through a conduit 110 to which chlorine is subsequently added, in predetermined or determinable amount, through the conduit 111 by means of a chlorine feeding device 112 which may, for example, be of the type described in United States Patent No. 1,777,987, issued October 7, 1930, to Charles F. Wallace. It will be understood that a supply of chlorine gas under pressure is contained in a cylinder 113 and fed to the chlorinator 112 through a pipe or tubing 114.

In ordinary cases, the flow of liquid through the conduit 110 may vary, for instance in accordance with the consumption or the requirements of use, and it is usually desirable to maintain at least a certain degree of proportionality between the flow of chlorine gas or solution through the pipe 111 and the flow of liquid through the conduit 110. For purposes of illustration a suitable device to accomplish such proportionality may be a differential converter designated as such on the drawings, Fig. 2, such as described in United States Patent No. 1,762,706, issued June 10, 1930, to Charles F. Wallace, The differential converter is operated by a Venturi meter 116 which creates a pressure differential that is conveyed to pressure sensitive elements (not shown) in the converter by means of suitable pipes 117 and 118. As will be apparent from the cited Patent No. 1,762,706, the converter produces a controlling vacuum which varies in accordance with variations in flow through the main 110, and which is transmitted to the vacuum type chlorinator 112, for control thereof, by means of the pipe 119.

The apparatus of the cited Patent No. 1,762,706 includes adjusting means for varying the ratio between the supply of chlorine and the rate of flow of the water or the like to which the chlorine is added; such adjusting means, comprising, for instance, the adjustable orifice 26 shown in Figs. 1 and 5 of the patent. Where the present invention is to be employed for automatically regulating the feed of chlorine to maintain a substantially constant or predetermined condition in the water treated, suitable means such as a reversible motor 120 may be provided to effect the desired adjustment, as by operating the stated adjustable orifice of the differential converter. Although other arrangements may be employed whereby a device such as the motor 120 is adapted to adjust the rate of chlorine supply or the ratio between such rate and the rate of flow of water (for example where Pitot tubes as in Fig. 6 of the patent are used instead of a venturi, the pressure differential may be too small for feasible use of an adjustable orifice, and the motor may then be arranged to adjust the position of fulcrum 17 in Fig. 6 of the cited patent, or to adjust a valve in the chlorinator such as the valve 140 in Fig. 2 of the other cited Patent No. 1,777,987), the adjustment of the orifice in the converter apparatus shown is a convenient arrangement and is therefore specifically described for purposes of illustration.

Advantageous arrangements for obtaining improved results, including an elimination of or other compensation for certain deleterious factors, comprise a plurality of depolarization cells exposed to the same liquid under test (e. g., the chlorinated water or other liquid to be tested for oxidizing or reducing material) and so designed or circumstanced that the slopes of their response curves are different. Conveniently the electrical circuit may be such that the translating device detects the difference between the currents flowing in the cells. Various arrangements may be adopted to provide different response curves in two cells: for instance, the cells may have different values of impressed voltage, or different anodes, or different cathodes, or may embody combinations of these differences.

Fig. 2, for example, shows a chlorine indicating and recording system wherein two depolarization cells 160, 161 of identical structure (like the cell of Fig. 1) are connected to receive different voltages, and to have the difference of their currents detected, as a difference of corresponding voltage drops, by a sensitive voltage-responsive translating device such as the recording potentiometer 162 having a full scale range of 10 millivolts and adapted to control the supply of chlorine to the water main 110 through chlorine supply and control instrumentalities as previously described. The voltage supply and regulating circuit (including the dry cell 70, rheostat 71 and milliammeter 76) includes a resistor 163 across which is connected the cell 160 and its dropping resistance 164, and a resistor 165 across which and the resistance 163 is similarly also connected the cell 161 and its dropping resistance 166. By way of example, suitable values for the resistances 163 and 165 are 5 and 7 ohms respectively, and for the resistors 164 and 166 (which are connected in series-opposition to the input of the recorder 162) 185 and 155 ohms respectively.

Both the cells are supplied with the same chlorinated water from the main 110 by a line 169 having branches 170, 171 leading to corresponding constant level boxes 172, 173, respectively feeding the cells 160, 161. To avoid or minimize even a long electrolytic connection between the cells, the pipes 170, 171 conveniently terminate in small outlets 174, 175 spaced above the level of water in the respective boxes 172, 173; as the water thus drips or runs slowly into the boxes, any flow of current that might tend to occur through the water itself or through the pipes is prevented or minimized by the intervening air.

As shown and described, cell 161 has a larger voltage impressed on it than cell 160 and consequently has a steeper response curve. In consequence, the difference between the currents flowing through the cells as a result of the depolarizing action of the chlorine in the water, will vary with variations in the quantity of chlorine, and detection of such difference with the translating device 162 will afford an indication or record of the chlorine concentration, and the changes therein, and may also, with the apparatus shown, serve to control the chlorinator 112 so that any desired quantity of residual chlorine is maintained in the treated water.

By way of example, certain curves obtained with apparatus of the sort shown in Fig. 2, are set forth in Fig. 3. The horizontal axis 180 represents the chlorine residual content in parts per million (determined, for test purposes, by individual analyses); while the vertical axis 181 represents the voltage (IR) drop in millivolts across the dropping resistance of the cell, corresponding to the depolarization current through the cell. Curve 182 is that of the cell having the higher impressed voltage (e. g. cell 161) and curve 183 that of the cell having the lower impressed voltage (e. g. cell 160); their difference, representing the actual electrical quantity read to determine the amount of chlorine present, is the curve 184. Curves 182a and 183a are also curves for the high and low voltage cells respectively, but taken with small amounts of ammonia in the water chlorinated, curves 182 and 183 having been obtained in the absence of ammonia in the water. Curve 184, however, representing the values detected, is also the difference between curves 182a and 183a (as well as the difference between curves 182 and 183); and it will be seen that the system thus very advantageously affords a reading of chlorine content which is truly representative and is unaffected by the presence of substances such as ammonia. As Fig. 3 demonstrates, the presence of even small quantities of ammonia would cause errors in the reading of either cell individually, but not so with the combined arrangement of Fig. 2.

In Fig. 4, which for simplicity of illustration shows only a recording device controlled by the depolarization system (but may be used for control purposes if desired), two depolarization cells 200, 201 (having, for example, silver anodes 200b, 201b) are employed which not only have different impressed voltages, but have different cathodes 200a, 201a, e. g. of copper and gold respectively. The circuit of cell 200 includes the dropping resistance 202 (say, 145 ohms) and voltage supply resistor 203, for example of 3.5 ohms, the latter being also included in the voltage regulating circuit of dry cell 70, rheostat 71 and milliammeter 76. The cell 201 is similarly connected in series with the dropping resistance 204 and across the voltage supply resistor 205, for instance of 220 and 10 ohms respectively, the resistor 205 receiving voltage drop from the separate supply and regulating circuit of dry cell 70a, rheostat 71a and milliammeter 76a.

Two potentiometric recorders 210, 211 (of the self-balancing type as in the other figures) each having a full scale range of 10 millivolts are shown. The meter 210 has its input connected in series with the dropping resistors 202, 204 (which are connected in series opposition, to produce a reading dependent on the difference of the currents through them) and the biasing resistor 212 which provides biasing voltage for the potentiometer 210 from a circuit comprising the dry cell 213, milliammeter 214 and the 2000-ohm rheostat 215. The other translating device 211 is connected, for purposes to be described, across the dropping resistance 204 of the gold-cathode, higher voltage cell 201.

Assuming that both cells 200, 201 are subjected to the same liquid to be tested, e. g. water after chlorination, supplied as by means of the sort shown in Fig. 2, Fig. 5 illustrates response curves obtainable with this system of Fig. 4, and components thereof. Like Fig. 3, the horizontal axis 220 represents chlorine residual in P. P. M. and the vertical axis 221, millivolts of IR drop (representing the depolarization current). Curve 222 is the response of the silver-copper cell 200, and curve 223 that of the silver-gold cell 201, both curves being taken in the absence of ammonia in the water. With small amounts of ammonia present, curves 222a and 223a represent the operation of the cells 200 and 201 respectively. Curve 224 is the difference between curves 222 and 223, and also represents the difference between curves 222a and 223a, showing that the current difference reading, obtained with the potentiometer 210, is a true detection of residual chlorine and is independent of even small amounts of substances such as ammonia.

It will also be noted from curve 223a that the silver-gold cell 201 (i. e., having the exposed gold cathode) in the arrangement of Fig. 4 shows no appreciable change in current with increased chlorine residual when small amounts of ammonia are present. Thus considering the chlorine, in the presence of ammonia, to exist as chloramines, it will be seen that the cell 201 individually affords a reading of only actual free chlorine (including hypochlorous acid) and is unaffected by chloramines. Hence the translating device 211, connected only across the dropping resistor 204 of the silver-gold cell 201, may be used to detect the extent of chlorine concentration when and if ammonia is absent—i. e. as explained, to detect the actual free chlorine as distinguished from the total available residual chlorine (including chloramines) which is detected by the recorder 210. Thus, where desired, the system of Fig. 4 may be usefully employed to afford separate detection of both types of chlorine concentration, i. e. the total residual and the actual free chlorine independent of chloramines.

It will now be appreciated that the various procedures and systems of the invention provide full realization of the stated objects, as well as of further advantages elsewhere above set forth. The described arrangements are efficient, extremely sensitive and remarkably accurate; and they afford reliable and reproduceable results, unaffected by one or more of various factors extraneous to the actual changes in composition, e. g. changes in content of oxidizing or reducing substance, which are sought to be detected. The methods and apparatus are readily susceptible of adaptation, with easily determined changes (if necessary) of voltage, resisttance values, electrode materials and the like, to fit them for a wide variety of uses, in providing indication, recording or control of the content of oxidizing or reducing substances in liquids. The invention, moreover, affords special advantages in the field of chlorine indication and control, as in water supply and sewage treatment systems where considerations of public health are often involved and emphasize the importance of reliability and accuracy in any automatic measurements.

In accordance with the provisions of the patent statutes, I have herein described the principles of operation of my invention, together with the apparatus and procedures which I now consider to represent the best embodiments thereof, but I desire to have it understood that the apparatus and procedures disclosed are only illustrative and that the invention can be carried out in other ways. Also, while it is designed to use the various features and elements in the combinations and relations described, some of them may be altered and others omitted and some of the features of each modification may be embodied in the others without interfering with the more general results outlined, and the invention extends to such use within the scope of the appended claims.

It will be understood that where reference is made in the claims to a test or other examination for chlorine content of a liquid, no restriction is intended as to the type of original chlorinating treatment, whether by addition of chlorine per se or otherwise, for example as hypochlorite; and similarly, unless otherwise expressly stated, the terminology of chlorine test in the claims is intended to refer generically to available chlorine and thus to be satisfied by test responsive to any one or more of its various forms, such as hypochlorous acid and chloramines.

Reference in the claims to "oxidation-changing" effect means reducing or oxidizing effect, generically; and reference to a predetermined direction of such effect means a selected one of such effects (viz., oxidation or reduction), exclusive of the other.

This application is in part a continuation of each of my aforesaid applications Serial Nos.

372,208, filed December 28, 1940, and 390,074, filed April 24, 1941.

I claim:

1. Apparatus for detecting the concentration, in a liquid, of a material capable of undergoing a change in its state of oxidation, comprising a pair of similar polarization cell devices, each of which comprises a cell having at least one electrode constructed and arranged to be in contact with the liquid containing said material and subject to depolarization thereby, said cell devices including circuit means for applying polarizing voltages across the electrodes of said cells, said cell devices being so constructed and arranged as to provide different characteristics of current flow respectively resulting from depolarization by given concentrations of said material in the liquid, and current responsive means connected to said cells for energization in accordance with the difference between the currents flowing through said cells respectively as indicative of the concentration of said material in the liquid.

2. Apparatus for continuously detecting the concentration, in a liquid, of a material capable of undergoing a change in its state of oxidation, comprising a pair of similar polarization cell devices, each of which comprises a cell having at least one electrode constructed and arranged to be laved by the liquid containing said material and subject to depolarization thereby, means for continuously passing portions of the same liquid through said cells so as to lave at least one electrode thereof respectively, said cell devices including circuit means for applying polarizing voltages across the electrodes of said cells, said cell devices being so constructed and arranged to provide different characteristics of current flow respectively resulting from depolarization by given concentrations of said material in the liquid, and current responsive means connected to said cells for energization in accordance with the difference between the currents flowing through said cells respectively as indicative of the concentration of said material in the liquid.

3. Apparatus for detecting the concentration, in a liquid, of a material capable of undergoing a change in its state of oxidation, comprising a pair of similar polarization cells, each of which comprises at least one electrode constructed and arranged to be in contact with the liquid containing said material and subject to depolarization thereby, means for supplying to said cells samples of said liquid, circuit means including at least one source of E. M. F. for impressing onto the electrodes of said cells respectively different polarizing voltages, so as to provide for said cells predetermined different characteristics of current flow respectively resulting from depolarization by given concentrations of said material in the liquid, and current responsive means connected to said cells for energization in accordance with the difference between the currents flowing through said cells respectively as indicative of the concentration of said material in the liquid.

4. Apparatus for detecting the concentration, in a liquid, of a material capable of undergoing a change in its state of oxidation, comprising a pair of similar polarization cells, each of which comprises at least one electrode constructed and arranged to be in contact with the liquid containing said material and subject to depolarization thereby, said electrodes of said cells being of different materials respectively, means for supplying to said cells samples of said liquid, circuit means including at least one source of E. M. F. for impressing onto the electrodes of said cells polarizing voltages, the different materials of said electrodes coupled with said polarizing voltages providing predetermined different characteristics of current flow respectively, resulting from depolarization by given concentrations of said material in the liquid, and current responsive means connected to said cells for energization in accordance with the difference between the currents flowing through said cells respectively as indicative of the concentration of said material in the liquid.

5. Apparatus in accordance with claim 4, wherein the metal of one of said electrodes arranged for contact with said liquid is copper and that of the corresponding electrode of the other of said cells is gold.

HENRY CLAY MARKS.